US009265012B2

(12) United States Patent
Garg et al.

(10) Patent No.: US 9,265,012 B2
(45) Date of Patent: Feb. 16, 2016

(54) TRANSMISSION POWER ADAPTATION FOR WIRELESS COMMUNICATION (71) Applicant: Broadcom Corporation, Irvine, CA (US)

(72) Inventors: Parag Garg, San Jose, CA (US); Chunyu Hu, Sunnyvale, CA (US)

(73) Assignee: BROADCOM CORPORATION, Irvine, CA (US)

(*) Notice: Subject to any disclaimer, the term of this patent is extended or adjusted under 35 U.S.C. 154(b) by 160 days.

(21) Appl. No.: 13/931,731

(22) Filed: Jun. 28, 2013

(65) Prior Publication Data
US 2014/0362723 A1 Dec. 11, 2014

Related U.S. Application Data (60) Provisional application No. 61/832,763, filed on Jun. 7, 2013.

(51) Int. Cl.
*H04W 52/26* (2009.01)
*H04B 17/318* (2015.01)
*H04W 52/28* (2009.01)

(52) U.S. Cl.
CPC ............ *H04W 52/267* (2013.01); *H04B 17/318* (2015.01); *H04W 52/286* (2013.01); *Y02B 60/50* (2013.01)

(58) Field of Classification Search
CPC ................. H04W 40/08–40/12; H04W 52/04; H04W 52/14; H04W 52/16; H04W 52/20; H04W 52/26; H04W 52/265–52/267; H04W 52/343; H04W 52/46; H04W 52/286; Y02B 60/50; H04B 17/318

USPC ................. 370/252–253, 310, 318, 328, 333, 370/338–339, 465–466, 470–473; 455/452.2, 522

See application file for complete search history.

(56) References Cited

U.S. PATENT DOCUMENTS

| 7,257,094 | B2* | 8/2007 | Shoemake | ............ | H04L 1/0002 370/311 |
| 7,653,408 | B1* | 1/2010 | Kopikare | .............. | H04W 52/16 455/522 |
| 8,565,805 | B1* | 10/2013 | Vargantwar | ......... | H04W 52/265 455/115.1 |
| 8,830,847 | B1* | 9/2014 | Doherty | ................ | H04W 40/12 370/252 |
| 2002/0167907 | A1* | 11/2002 | Sarkar | .................... | H04L 1/1867 370/252 |
| 2003/0050086 | A1* | 3/2003 | Lee | ...................... | H04W 52/325 455/522 |
| 2004/0218630 | A1* | 11/2004 | An | .......................... | H04L 47/10 370/470 |
| 2005/0113106 | A1* | 5/2005 | Duan | .................... | H04L 1/0002 455/452.2 |
| 2006/0276217 | A1* | 12/2006 | Khojastepour | .......... | H04B 7/04 455/522 |

(Continued)

*Primary Examiner* — Charles C Jiang
*Assistant Examiner* — Mohamed Kamara
(74) *Attorney, Agent, or Firm* — Foley & Lardner LLP; Christopher J. McKenna; Paul M. H. Pua (57) ABSTRACT Systems and methods are provided for dynamically/during operation, adapting transmission power in a wireless communication device. The adapting of transmit power in a wireless communication device can be performed on a per-packet, as well as a per-link basis. Before determining to adapt transmit power, various conditions, configurations, and or operational information can be analyzed. That is, the quality of service associated with a link, the stability of the link, as well as, e.g., the stability of a current transmit rate being utilized can be considered, such that the user experience, e.g., throughput, need not be negatively affected in order to implement power savings by lowering transmit power.

20 Claims, 7 Drawing Sheets

(56) References Cited

U.S. PATENT DOCUMENTS

2008/0175189 A1\* 7/2008 Furrer .................. H04B 7/0689 370/328

2009/0215485 A1\* 8/2009 Kwon .................... H04L 47/10 455/522

\* cited by examiner

TRANSMISSION POWER ADAPTATION FOR WIRELESS COMMUNICATION

TECHNICAL FIELD

The technical field of the present disclosure relates to wireless communication systems, and more particularly, to conserving packet transmission power while maintaining throughput based on per packet transmit power regulation.

BACKGROUND

Communication systems may support wireless and wireline communications between wireless and/or wireline communication devices. Each type of communication system may be constructed/configured to operate in accordance with one or more communication standards. For instance, wireless communication systems may operate in accordance with one or more standards including, but not limited to, Radio Frequency Identification (RFID), Institute of Electrical and Electronic Engineers (IEEE) 802.11, Bluetooth®, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

A wireless communication device, such as a cellular telephone, two-way radio, personal digital assistant (PDA), personal computer (PC), laptop computer, home entertainment equipment, radio frequency identification (RFID) reader, RFID tag, etc. may communicate directly or indirectly with other wireless communication devices. For direct communications (also known as point-to-point communications), the participating wireless communication devices may tune their receivers and transmitters to the same channel(s) (e.g., one of the plurality of RF carriers of a wireless communication system or a particular RF frequency for some systems) and communicate over that channel(s). For indirect wireless communications, a wireless communication device may communicate directly with an associated BS (e.g., for cellular services) and/or an associated access point (AP) (e.g., for an in-home or in-building wireless network) via an assigned channel. The BS/AP may then relay the communication to another wireless communication device either directly or through additional base stations/access points, etc. To complete a communication connection between the wireless communication devices, the associated BSs and/or associated APs may communicate with each other directly, via a system controller, the public switch telephone network, the Internet, and/or some other wide area network.

To participate in wireless communications, each wireless communication device may include a built-in radio transceiver (i.e., receiver and transmitter), or may be coupled to an associated radio transceiver (e.g., a station for in-home and/or in-building wireless communication networks, RF modem, etc.). In most applications, radio transceivers are implemented in one or more integrated circuits (ICs), which can be inter-coupled via traces on a printed circuit board (PCB).

A transmitter aspect of the radio transceiver can include a data modulation stage, one or more intermediate frequency (IF) stages, and a power amplifier (PA). The data modulation stage can be configured to convert raw data into baseband signals in accordance with a particular wireless communication standard. The one or more intermediate frequency stages can be configured to mix the baseband signals with one or more local oscillations to produce RF signals. The PA can be configured to amplify the RF signals prior to transmission via an antenna.

A receiver aspect of the radio transceiver can be coupled to the antenna through an antenna interface and can include a low noise amplifier (LNA), one or more intermediate frequency stages, a filtering stage, and a data recovery stage. The LNA can be configured to receive inbound RF signals via the antenna and amplify them. The one or more IF stages can be configured to mix the amplified RF signals with one or more local oscillations to convert the amplified RF signal into baseband signals or IF signals. The filtering stage can be configured to filter the baseband signals or the IF signals to attenuate unwanted, out-of-band signals to produce filtered signals. The data recovery stage can then recover raw data from the filtered signals in accordance with the particular wireless communication standard.

BRIEF DESCRIPTION OF THE DRAWINGS

For a more complete understanding of example embodiments of the present disclosure, reference is now made to the following descriptions taken in connection with the accompanying drawings in which.

DETAILED DESCRIPTION

Improving performance of wireless communication devices, such as wireless-enabled laptop computers, PDAs, portable music players, portable televisions, cellular telephones, and similar mobile devices is a goal of design engineers, and demanded by users. Performance improvements can include, e.g., providing more services/applications/functionality, which must often be balanced with power consumption.

Users in a wireless environment are typically mobile, and so may come in and out of range of wireless APs. Not all APs may support the connections desired by a user, and not all APs provide optimal access (such as high speed wireless links). In addition, other environmental factors, such as interference and a constantly changing multipath environment, may also influence the quality and availability of wireless network connections. Therefore, establishing, maintaining, and optimizing network connections and quality is an ongoing task.

Wireless communication devices can transmit and receive data in the form of frames. A frame can refer to a basic message unit for communication across a network, e.g., a wireless network/communication system. A frame can include routing information, data, and error detection information. Depending on the physical layer (PHY) protocol, a frame can be transmitted at various transmission rates, e.g., the IEEE 802.11a PHY supports a rate set {6, 12, 18, 24, 36, 48, 54} Mbits/s. In general, the larger the distance between a transmitter and target receiver, the lower the transmission rate, since the received signal strength is lower. Additionally, wireless communications are prone to interfering signals caused by, for example, microwave ovens, cordless telephones, Bluetooth® devices, and other wireless devices, operating at overlapping or neighboring frequency ranges. In such noisy environments, the transmission rate of frames tends to be low in order to improve throughput and maintain a low packet error rate (PER). Once a frame is passed on to the upper layer (network layer), and additional information (e.g., sending and receiving Internet Protocol (IP) address) is attached, the frame can be referred to as a packet.

Wireless communication systems, such as wireless local area networks (WLANs) are being developed and deployed in environments where larger and larger numbers of users must be supported. Throughput (alluded to above) can be considered an indicator of the performance of a WLAN because it provides an indication of the time it takes to send information. Throughput can refer to the flow of information over time, e.g., an average rate of successful packet delivery or "actual" speed at which data can be sent/received. Because there is idle time between 802.11 data frames and retransmission due to noise, throughput can be less than the transmission rate. As such, it is possible to have a high 802.11 transmission rate, while having relatively low throughput, for example, when a wireless communication device, such as a cellular telephone, is near an AP, but a large number of other wireless communication devices are also accessing the WLAN from the same AP, or, again, if there is substantial radio signal interference.

Regarding power, increasing the transmit power of an 802.11 radio transceiver can increase performance in the transmit direction. As the transmit power increases, transmission rates also increase. For example, increasing the transmit power of a wireless communication device embodied as/implemented within an AP can cause an increase in signal level/strength and corresponding SNR within the coverage area of that AP. A client device, such as a wireless communication device embodied as/implemented in a cellular telephone associated with the AP can also increase its transmit power, thereby resulting in increased signal level/strength and SNR on the client side.

Figure 1A:
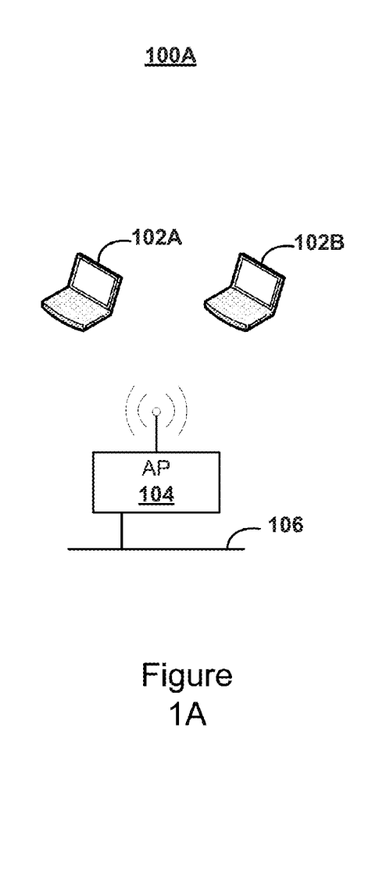
FIGS. 1A and 1B are block diagrams representative of example wireless networks in which various embodiments of the present disclosure can be utilized.
Figure 1B:
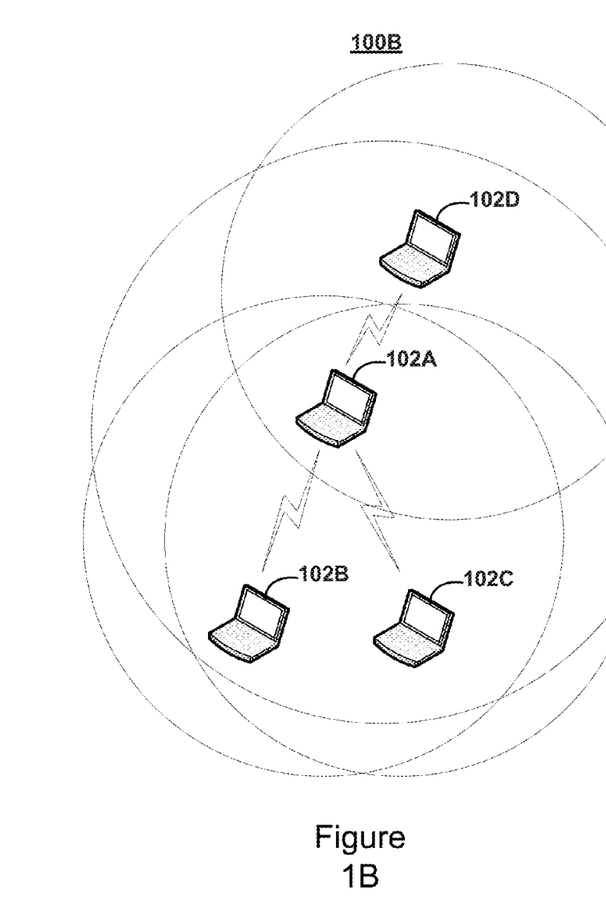

FIGS. 1A and 1B illustrate example wireless network environments 100A and 100B, respectively. In practical application, these wireless network environments may be any kind of public or private space which are designed for wireless network access. Such wireless networks or environments may include, for example and without limitation, offices, airports, train stations, factories, internet cafés, any outdoor environment configured for wireless access, and similar environments.

The wireless network environments 100A and 100B may include one or more wireless communication devices adapted to provide user access to wireless networks. For example, wireless communication devices 102A-102D may be, e.g., WiFi-enabled wireless communication devices including, but not limited to, a PDA, a laptop computer with WiFi capabilities, a portable music player, a wireless television receiver, a cellular telephone with WiFi capabilities, or one of many kinds of similar wireless communication devices. Other examples of wireless communication devices may include various kinds of portable medical monitoring and reporting devices, a variety of portable communications devices used in law enforcement and/or military applications, location determination devices (such as those associated with the Global Positioning System (GPS)), and a variety of wireless technologies which may be used in various industrial and enterprise contexts for such purposes as inventory tracking and monitoring. One or more of the wireless communication devices 102A-102D may contain within, or have attached to it, a wireless communication module (not illustrated), or may have a port or card slot configured to access a wireless communication module.

The wireless network environment 100A can be representative of an infrastructure environment in which one or more APs 104 are adapted to transmit and receive network information (e.g., to/from network 106), and are adapted to support a plurality of wireless communication devices 102A and 102B. Examples of APs may include WiFi APs, cellular towers used in cellular telephone networks and other wireless applications, and similar distribution points for wireless signals. A group formed by AP 104 (and the wireless communication devices 102A and 102B in its coverage area) can be considered a basic service set (BSS) or cell. Two or more BSSs can be linked to form an extended service set (ESS).

The wireless network environment 100A may support one or more networks 106 which provide data to AP 104 to broadcast, and which also receive data from wireless communication devices 102A and 102B via APs 104. It should be noted that various hardware, not illustrated, may be relied upon to support network activities in this network environment. Such hardware may include but is not limited to network servers, authentication servers, routers, modems, and various kinds of RF equipment. It should be further noted that in some cases hardware associated with network 106 may be substantially co-located with AP 104. In other cases, hardware associated with network 106 may be remote from AP 104 and linked to AP 104 via cabling such as electrical cables or fiber optic cables.

The wireless network environment 102B may be representative of an independent BSS (IBSS) environment in which there are no separate APs. Instead, each of wireless communication devices 102A-102D acts as both an AP and a client. The range of an IBSS environment can depend on the ranges of each wireless communication device. As can be seen in FIG. 1B, wireless communication devices 102A, 102B, and 102C are all within each others' wireless ranges. Wireless communication device 102D, however, is only within range of wireless communication device 102A.

As alluded to previously, the quality of service between various APs and/or wireless communication devices can vary. Quality of service factors for a network connection (or link) may include the speed of network connection, the security level of network connection, the types of services supported by a network connection, the connection reliability and bandwidth guarantees, and other factors which may affect the nature and quality of the network connection available to a user of a wireless communication device.

Moreover, the aforementioned factors affecting quality of service for a network connection can also vary depending on variable factors within the wireless network environment. For example, movement of objects within a network environment can affect the link quality. In addition, factors entirely external to the wireless network environment may affect network connections. For example, a given wireless network may temporarily go offline for a variety of reasons (e.g., due to power failures, disruptions in communications lines, network server crashes, problems with intermediary or linking networks, deliberate electronic network attacks, etc.), only to become available again at a later time.

As a result, the quality of service associated with links available to a wireless communication device may vary over time, and may also vary as a user of the wireless communication device physically moves around within an area covered/serviced by the wireless network. The user may have preferences among various network connections, with various priorities regarding those preferences. The user may be in proximity of other devices, such as microwave ovens, cordless telephones, Bluetooth® devices, and other wireless devices, that may cause interference with their wireless signals.

Figure 2:
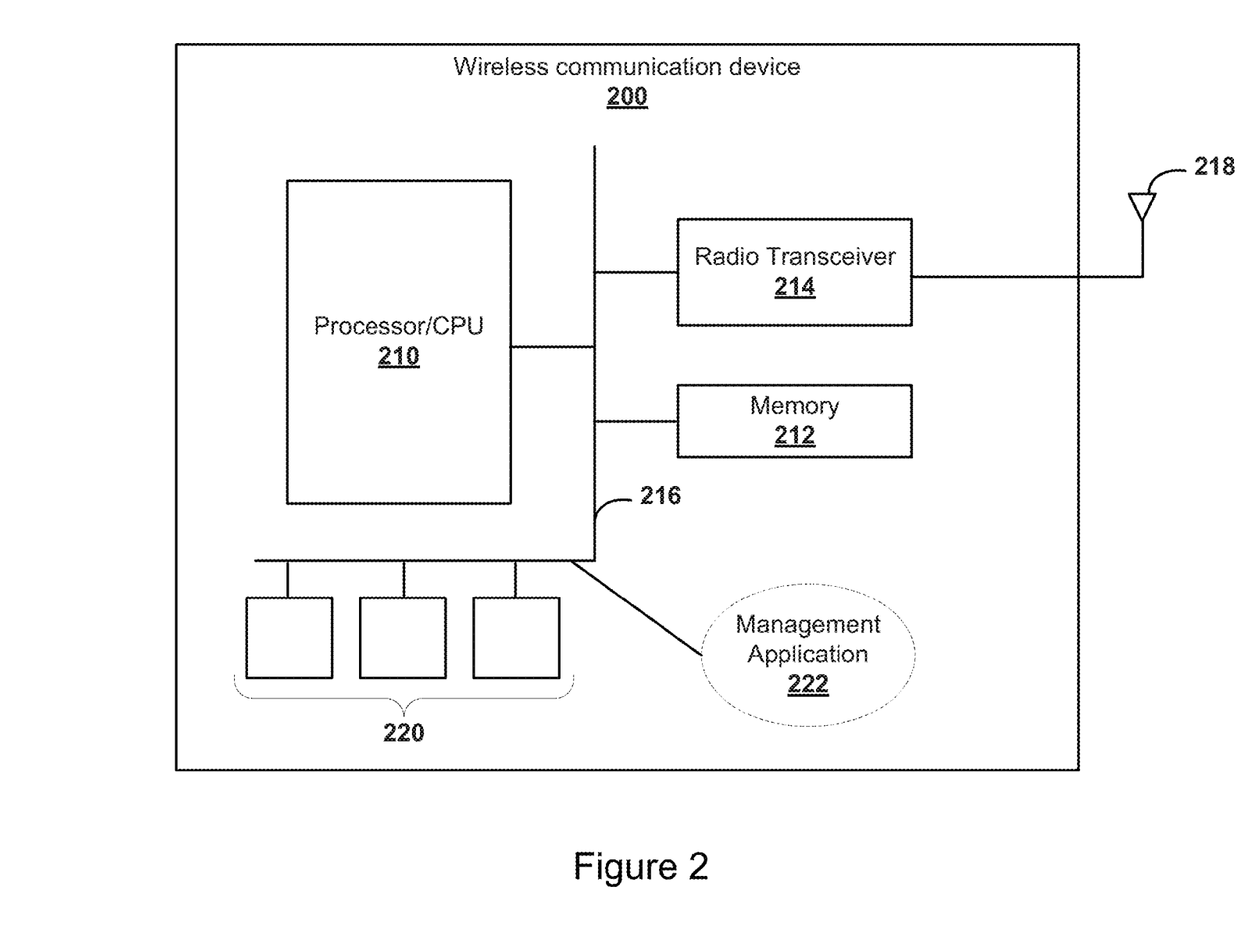
FIG. 2 is a block diagram representative of an example wireless communication device accordance with various embodiments of the present disclosure.

FIG. 2 is a block diagram of an example wireless communication device 200 (such as one of wireless communication devices 102A-102D illustrated in FIGS. 1A and 1B), which may be, for example, a WiFi device or a WiFi-enabled device, and are adapted for communication based on the IEEE 802.11 communications protocol. The 802.11 protocols include, for example, the 802.11a/b/g/n protocols, as well as other related protocols which may currently be under development or may be forthcoming in the future.

Wireless communication device 200 may include a processor/central processing unit (CPU) 210, a memory 212, and a radio transceiver 214. Wireless communication device 200 may further include an antenna 218. Radio transceiver 214 may be adapted to modulate outgoing wireless messages for transmission via antenna 218. Radio transceiver 214 may be further adapted to demodulate transmissions received via antenna 218. It should be noted that radio transceiver 214 may be embodied as a single radio transceiver, or some combination of two or more separate transmitter and receiver modules. Wireless communication device 200 may also include any number of additional chips, elements, and/or components schematically represented as elements 220 for providing various functionality (e.g., display capabilities, input capabilities, etc.) Memory 212, radio transceiver 214, and elements 220 may be in communication with CPU 210, e.g., via bus 216.

CPU 210, memory 212, additional elements 220, radio transceiver 214, and antenna 218 can interconnected with each other as necessary in order to support the operations of wireless communications. The connections between these components as illustrated in FIG. 2 are exemplary only, and other connections are possible. For example, and in accordance with certain embodiments, one or more of these components may be on one or more separate chips or integrated circuits (ICs).

CPU 210 can be programmed or adapted to perform a variety of high-level tasks, including managing and establishing network associations between wireless communication device 200 and a wireless communication network. Accordingly, the various features, capabilities, and/or related programs may be implemented in a management application 222, including transmission power adaptation, which is further discussed below.

CPU 210 may perform a variety of tasks pertaining to the general purpose or general operations of wireless communication device 200. For example, and if wireless communication device 200 is embodied in or as a cellular telephone, CPU 210 may perform tasks related to digital signal processing and other management tasks related to sending and receiving a cellular telephone call. If wireless communication device 200 is embodied in or as a laptop computer, CPU 210 may perform all the tasks necessary to support software running on the laptop computer.

CPU 210 may be further configured to support a variety of low level communications tasks. For example, CPU 210 may be configured to support those tasks which are typically associated with medium access control (MAC) operations in a communications device, where CPU 210 may be configured to operate as MAC via instructions stored in memory 212. In particular, managing wireless communication tasks discussed in further detail below may be encapsulated in an application or application software, such as management application 222.

Management application 222 may be implemented in or as software, although management application 222 may also or further be implemented via dedicated hardware, via firmware, and/or via device driver, and may be embodied and implemented via one or more of CPU 210, and/or memory 212, as well as with other components if necessary. Management application 222 may be implemented as a computer program product implemented on a computer readable medium that causes CPU 210 to implement various instructions and/or perform various processes.

Figure 3:
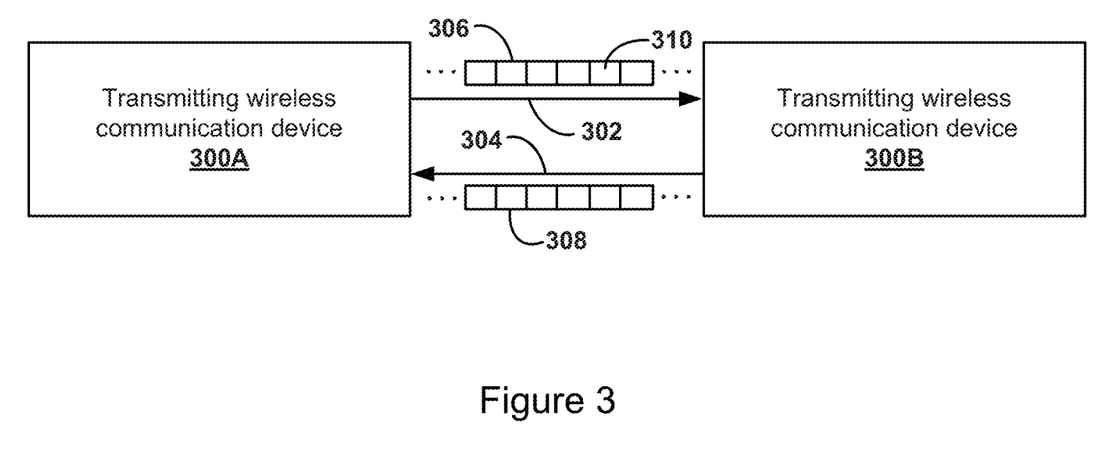
FIG. 3 illustrates example frames being transmitted from a transmitting wireless communication device to a receiving wireless communication device.

Wireless devices such as wireless device 200 may transmit and receive data via signals containing frames, as previously indicated. An example of such transceiving is shown in FIG. 3, where a transmitting wireless communication device 300A can communicate wirelessly with a receiving wireless communication device 300B. Transmitting wireless communication device 300A may be a wireless communication device, such as a laptop, or an AP. Receiving wireless communication device 300B may also be a wireless communication device, such as a cellular telephone or an AP. Transmitting wireless communication device 300A can generate a frame 306 to be sent to receiving wireless communication device 300B as part of a wireless signal 302. Frame 306 may contain one or more subframes 310.

When receiving wireless communication device 300B receives frame 306, it can generate a feedback frame 308 that is returned to transmitting wireless communication device 300A as part of a wireless signal 304. Feedback frame 308 may provide status information regarding the reception of frame 306, including information related to the number of subframes 310 in frame 306 that have been successfully received by receiving wireless communication device 300B. This status information can be useful in deciding whether transmitting wireless communication device 300A should re-transmit the whole frame 306, or a portion thereof (partial frame). For example, if transmitting wireless communication device 300A transmitted and then re-transmitted transmission frame 306 a number of times that exceeds a predetermined threshold, and does so at a current primary transmission rate (e.g., 78 Mbps), transmitting wireless communication device 300A can then attempt to resend frame 306 at a lower transmission rate (e.g., 39 Mbps), known as a fallback rate. Frame 306, transmitted at the fallback rate, has a higher probability of being successfully received at receiving wireless communication device 300B. The status information may also be useful in deciding at what transmission rate a future outgoing frame(s) should be sent.

As previously indicated, increasing the transmit power of an 802.11 radio transceiver can increase performance in the transmit direction. Accordingly, and in conventional radio transceivers, transmit power is set to a maximum or nominal power (as specified by regulatory limits/standards). For example, low power WLAN chipsets or ICs (implementing radio transceivers) may transmit MAC protocol data units (MPDUs), i.e. messages exchanged between MAC entities, using nominal/max power regardless of link quality. Conventional methods of transmit power control can involve implementing transmit power control at both wireless communication devices, and may involve protocol overhead to accommodate initial handshake procedures, as well as routine measurement updates. Further still, conventional methods of transmit power control is applied to every wireless communication device in a BSS for all packets, and may not be well suited to changing local link conditions. Still other conventional methods of transmit power control can involve using received signal strength indication (RRSI), which also involve certain overhead to handle noise calibration, and rely on an assumption of link symmetry. That is, transmit power control using RSSI assumes reciprocity in the transmission medium so that the transmitting and receiving wireless communication devices use the same level of transmit power, even though link symmetry is not guaranteed.

Accordingly, various embodiments are directed to a link power control algorithm adapted to conserve power of a wireless communication device by controlling the transmit power of each packet while taking into account, current transmission and link conditions/configurations. This per-packet method of varying power can be based upon a throughput-based rate selection algorithm that can take into account link quality of every/any link at issue (and maintain intelligence/information regarding link quality), and output transmission rate and throughput information. The link power control algorithm can control transmit power based on/utilizing the intelligence regarding link quality, as well as the transmission rate and throughput information output from the throughput-based rate selection algorithm. As a result, a lower transmit power can be utilized as long as the current/preferred throughput can be maintained, thereby conserving power without affecting the user experience.

Figure 4:
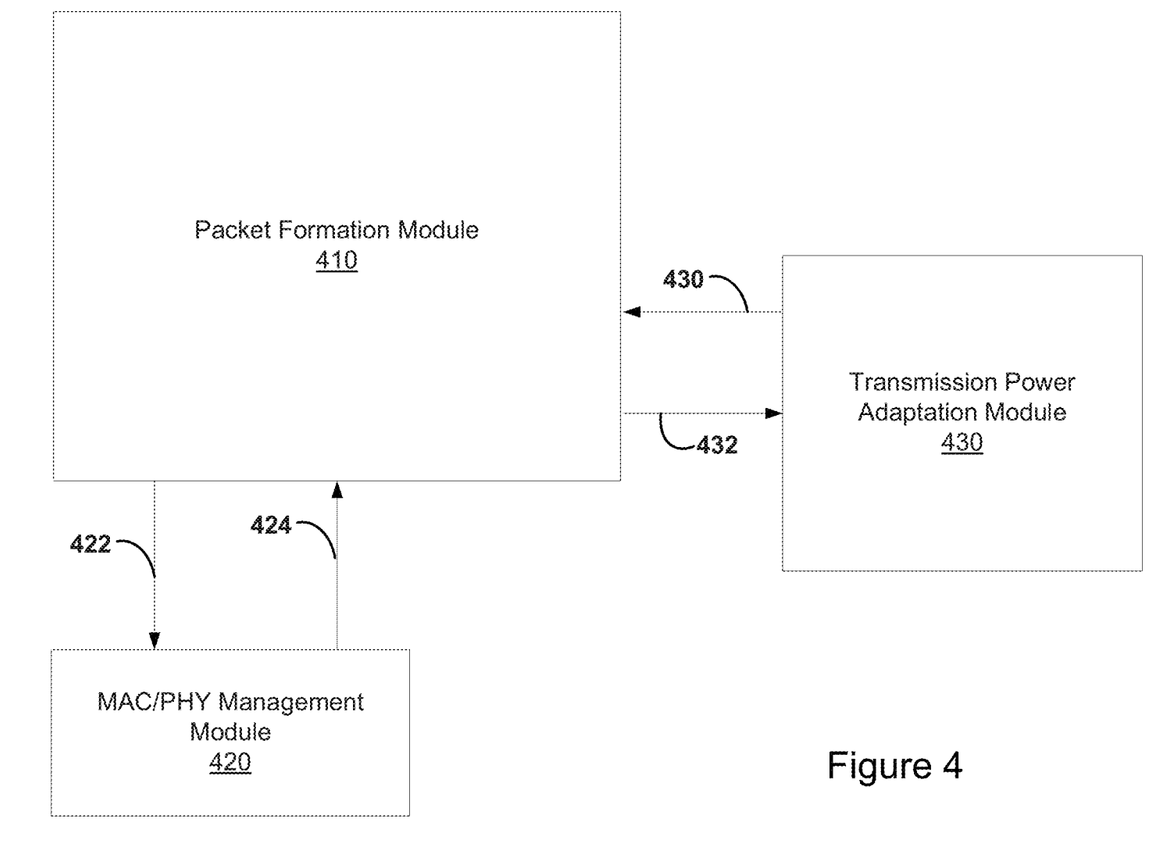
FIG. 4 illustrates an example system for adapting transmission power in accordance with various embodiments.

FIG. 4 illustrates an example system 400 for adapting transmission power in accordance with various embodiments. System 400 can include a packet formation module 410, a MAC/PHY management module 420, and a transmission power adaptation module 430. It should be noted that although modules 410, 420, and 430 are described and illustrated as three separate modules, such modules are representative of their respective functionalities, and need not necessarily be implemented in such a manner. That is, modules 410, 420, and 430 may exist as a combination of fewer or more modules. Additionally, some, or all of modules 410, 420, and 430 may be located within CPU 210 of wireless device 200, or located outside of CPU 210 as one or more of elements 220, for example.

Packet formation module 410 can handle the wrapping and aggregation of transmission frames 306 (illustrated in and described in conjunction with FIG. 3), determines transmission instructions associated with each frame, and passes the completed frames and transmission instructions to the MAC/PHY management module 420 (indicated by arrow 422) for transmission. For example, packet formation module 410 may prepare frames for transmission, providing specific transmission instructions for each. The frames may be wrapped into, e.g., a lower level format MPDU to be transmitted individually, or are further aggregated to be transmitted in a bigger frame, and passed to the MAC/PHY management module 420 for transmission. It should be noted that a MAC service data unit (MSDU) can refer to a unit of transmission utilized at the MAC layer that is received from the logical link control (LLC) sub-layer that lies above the MAC sub-layer in a protocol stack, while MPDU can refer to the frames passed from the MAC layer(s) into the PHY layer.

After completing the transmission, MAC/PHY management module 420 may generate a report (indicated by arrow 424) of the transmission result, either by means of receiving a feedback frame from a receiving wireless communication device (such as feedback frame 308 from receiving wireless communication device 300B in FIG. 3), or by virtue of a time-out mechanism that allows a maximum amount of waiting time for a feedback frame. Depending on the transmission status of the MSDU(s)/MPDU(s), packet formation module 410 can, e.g., effectuate retransmissions and/or update transmission instructions for subsequent frame transmissions. One example of updating transmission instructions is changing the rate of transmission, which as described above, can be controlled using the throughput-based rate selection algorithm (which can be implemented in transmission power adaptation module 430).

Transmission power adaptation module 430 may further include an implementation of the aforementioned link power control algorithm, as well as one or more databases for the storage and accessing of various parameters (to be discussed in greater detail below, and a Power Backoff/Offset lookup table (LUT) that can be utilized to vary/adapt the transmit power per MPDU. It should be noted that MAC firmware can program an index of the Power Backoff/Offset LUT to be utilized for any particular packet, where transmit power can be regulated, e.g., in steps of 0.5 dB based on the value at the index. An MSDU transmission status can be transmitted to the transmission power adaptation module 430 (as indicated by arrow 432), while any change or adaptation of transmit rate can be sent to packet formation module (as indicated by arrow 430).

Figure 5A:
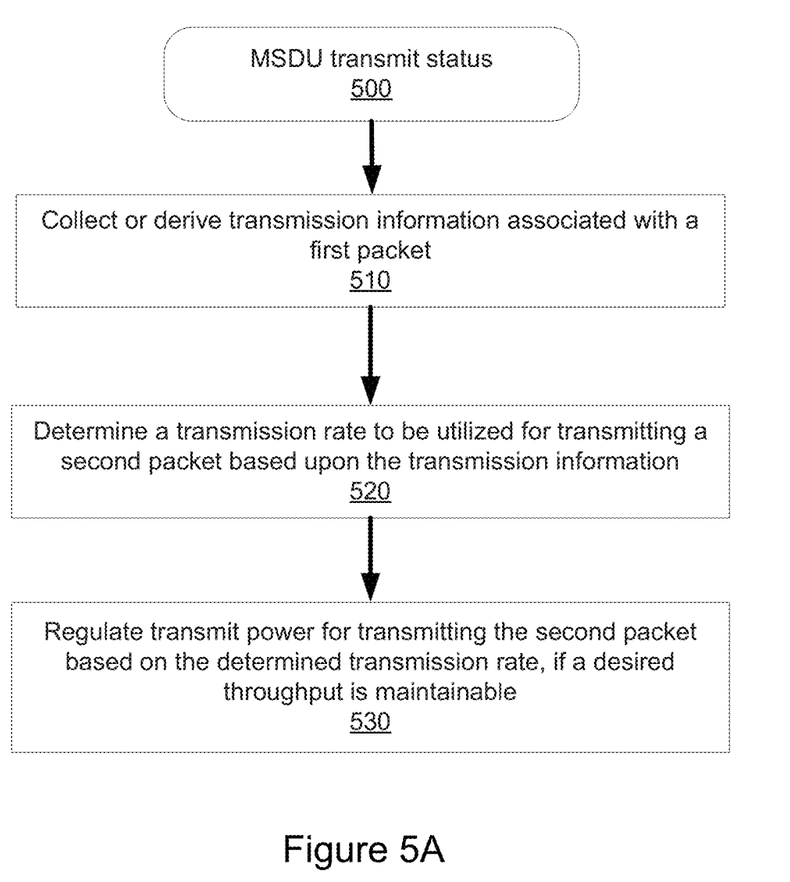
FIGS. 5A and 5B are flow charts illustrating example processes performed for transmit power adaptation in accordance with various embodiments of the present disclosure.

FIG. 5A illustrates example processes performed for implementing transmit power control in accordance with various embodiments. At 500, MSDU transmit status can be determined as described above. For example, the MSDU transmit status can be the state at which a wireless communication device is attempting to process/transmit a first packet, e.g., the first packet may have gone through to a receiving wireless communication device, or maybe the first packet may have been lost, packet transmission may have been retried for the first packet (i.e., packet retransmission), etc. At 510, (based on the attempted processing of the first packet), transmission information associated with the first packet can be collected. For example, statistics may be collected for the first packet regarding the number of transmit attempts/retries performed. It should be noted that statistics cannot be collected, for example, if transmission information regarding the first packet is simply not available for some reason, various embodiments contemplate the ability to "derive" transmission information that can be utilized, resulting in a "self-contained" system.

At 520, a transmission rate to be utilized for transmitting a second (e.g., subsequent or next) packet can be determined based upon the collected (or derived) transmission information. In other words, the aforementioned throughput-based rate selection algorithm can process the collected/derived transmission information regarding the first packet, to make the transmission information relevant for use by the aforementioned link power control algorithm. At 530, transmit power for transmitting the second packet can be regulated based on the determined transmission rate, if a desired (e.g., current) throughput is maintainable. That is, and from the collected or derived transmission information, the throughput-based rate selection algorithm may calculate, derive, or otherwise "prepare" at least one or more of the following parameters for use by the link power control algorithm.

Highest Rate
Short-term Packet Success Rate (PSR(st))
Long-term PSR (PSR(lt))
Throughput Ratio
Rate Stability Measure
Throughput Ratio Threshold The "Highest Rate" parameter can refer to the highest transmit rate possible in current configuration, and can be utilized to filter out any responses for packets that were attempted to be transmitted at transmit rates below the highest transmit rate. The "Short-term PSR" parameter can refer to the short-term PSR, e.g., a percentage of the number of successful transmissions per number of total transmissions. It should be noted that the Short-term PSR can be adjusted as to the number of packets analyzed. For example, in accordance with one embodiments, the Short-term PSR can be adjusted to account for just the last packet, while in accordance with another embodiment, the Short-term PSR can be adjusted to account for N number of previous packets. The "Long-term PSR" parameter can refer to long-term PSR, e.g., a moving average of the success rate of packet transmissions since a last/previous transmit rate change/adjustment. Again, the Long-term PSR parameter can be adjusted to account for any N number of packets. The "Throughput Ratio" parameter can refer to a respective, current throughput ratios associated with primary transmit and secondary (lower) transmit rates, and can be utilized to determine whether to maintain the transmit rate at the primary rate or to lower the transmit rate to a secondary rate. That is, and as will be described in greater detail, if a current transmit rate can be supported even with a lower transmit power, the lower transmit power may be utilized. The "Rate Stability Measure" parameter can refer to the stability of the current transmit rate at a present link quality. It should be noted that as will be discussed in greater detail, various embodiments can be implemented such that the link power control algorithm may only consider lowering transmit power of a present transmit rate only when it is stable. The "Throughput Ratio Threshold" parameter can refer to a threshold for comparing the aforementioned Throughput Ratio parameter with, in order to determine whether or not transmit power should be, e.g., maintained, stepped up/increased, or stepped down/decreased (allowing for power conservation). The Throughput Ratio Threshold may be calculated as follows, for example, using the primary transmit rate and the secondary transmit rate with an ideal PSR (e.g., 100% success rate for packet transmission):

$$\frac{(\text{primary rate}/\text{secondary rate}) * 100 - 100}{2} + 100$$

For example, if the primary to secondary rate ratio is 1.10, the Throughput Ratio Threshold will be 1.05. Accordingly, if a measured throughput ratio is above the Throughput Ratio Threshold, it may be possible to lower transmit power, while if the measured throughput ratio is below the Throughput Ratio Threshold, it can be assumed that transmit power should not be regulated (e.g., lowered).

Additionally, the following parameters can be maintained within the throughput-based rate selection algorithm on a per-link/link-specific (i.e. per subsystem control block (SCB)) basis.

---

Throughput Ratio Status
Throughput Ratio Status Validity
Last Attempt Status
Last Attempt Status Validity
Throughput Ratio Threshold
Rate Threshold

---

The "Throughput Ratio Status" parameter can denote whether a current ratio of throughput between the primary and secondary rates are above the aforementioned Throughput Ratio Threshold. Accordingly, the value of the Throughput Ratio Status parameter can be used by the link power control algorithm to determine whether the current transmit power (level) is sufficient enough to sustain the current transmit rate. The "Throughput Ration Status Validity" parameter can refer to an indication of whether the value of the Throughput Ratio Status parameter is "valid" for the current MSDU/MPDU transmit status. The "Last Attempt Status" parameter can be used to denote if a last transmit attempt at the current transmit power and transmit power was successful or not. This status can be one factor in determining whether or not to change/regulate transmit power, and is indicative of a comparison between the Long-term and Short-term PSRs. The "Last Attempt Status Validity" parameter can be used to indicate whether the Last Attempt Status value is valid for the current MSDU/MPDU transmit status. The "Throughput Ratio Threshold" parameter is that previously described above. The "Rate Threshold" parameter denotes a transmit rate threshold for a particular link, and may be assigned the highest transmit rate value possible for that link.

Based on one or more of the above-mentioned parameters provided by the throughput-based rate selection algorithm, the link power control algorithm can determine whether or not to regulate transmit power for a subsequent packet. In particular, the link power control algorithm may utilize the following configuration parameters.

---

Rate Stability Threshold
Power Stability Threshold
Link Power Control Info Expiry Time
Slow Step Up Granularity
Fast Ste Up Granularity
Slow Step Down Granularity

---

The "Rate Stability Threshold" parameter can denote the threshold utilized by the link power control algorithm to compare the number of packets transmitted successfully at a current transmit rate with the aforementioned Rate Stability Measure parameter. The "Power Stability Threshold" parameter can refer to a threshold against which to compare the number of successfully transmitted packets at the current transmit rate and transmit power. Again, the link power control algorithm can be configured such that transmit power is lowered only if the current transmit rate is stable, and if link quality is good in order to ensure that the desired number of packets can be transmitted before any lowering of transmit power is effectuated. It should be noted that these thresholds are set by the link power control algorithm, and can be dynamically derived during operation, on a per-link basis, in order to determine whether or not the link power control algorithm should regulate transmit power.

The "Link Power Control Info Expiry Time" parameter can be used to set for a predetermined period indicative of inactivity so that after expiration of the Link Power Control Info Expiry Time, information that has been, e.g., collected, for a particular link may be considered stale, and discarded, after which transmit power can be defaulted to nominal power. This parameter allows information to be "aged out," and the aforementioned database for storing collected statistics can be refreshed. For example, after, e.g., 1000 packets have been transmitted, there may be some pause in activity. If the time of the pause surpasses the Link Power Control Info Expiry Time value, it can be assumed that the transmission information regarding the previously transmitted 1000 packets (as well as, e.g., the Rate Stability Threshold and Power Stability Threshold values) may no longer be relevant for determining a transmission rate, and ultimately, regulating/determining whether to regulate transmission power for subsequent packets.

The "Slow Step Up Granularity" parameter can refer to a step size utilized when a slow step up of transmit power (power index) is warranted. The step sizes can be configured in terms of dB, and can depend on a backoff index programmed in a link power control Power Backoff/Offset LUT (alluded to previously). For example, if a link power control Backoff/Offset LUT has indexes defined in 0.5 dB steps then a Slow Step Up of 2 translates into a power difference of 1 dB (2×0.5 dB). The "Fast Step Up Granularity" parameter can refer to a step size used when a quicker step up of transmit power/power index is warranted, while the "Slow Step Down Granularity" parameter can refer to the step size used when a slow step down of transmit power/power index is warranted.

Like the throughput-based rate selection algorithm, the link power control algorithm may maintain certain link-specific (SCB/AC) parameters, which are as follows.

Last Update Time
Power Stability Count
Current Power Level Index
Link Power Control Info Expired The "Last Update Time" parameter can be utilized to denote a time (e.g., in seconds), when the link power control algorithm configuration parameters were last updated, and can be compared with the aforementioned Link Power Control Info Expiry Time parameter value to determine the relevance of the configuration parameters. The "Power Stability Count" parameter can be used to denote the number of packets that have been successfully transmitted at the current transmit rate and transmit power. This parameter can be used to determine if the aforementioned Power Stability Threshold has been met or exceeded. The "Current Power Level Index" parameter can refer to the transmit power/power index currently being used to transmit packets, and can be utilized in conjunction with the aforementioned Slow Step Up, Fast Step Up, and Slow Step Down Granularity parameters to indicate from what transmit power/power index to effectuate the stepping up or down of transmit power. The "Link Power Control Info Expired" parameter can be indicative of whether the link power control information maintained for a particular link has been reset/aged out, i.e., if the aforementioned Link Power Control Info Expiry Time has been met or exceeded.

Figure 5B:
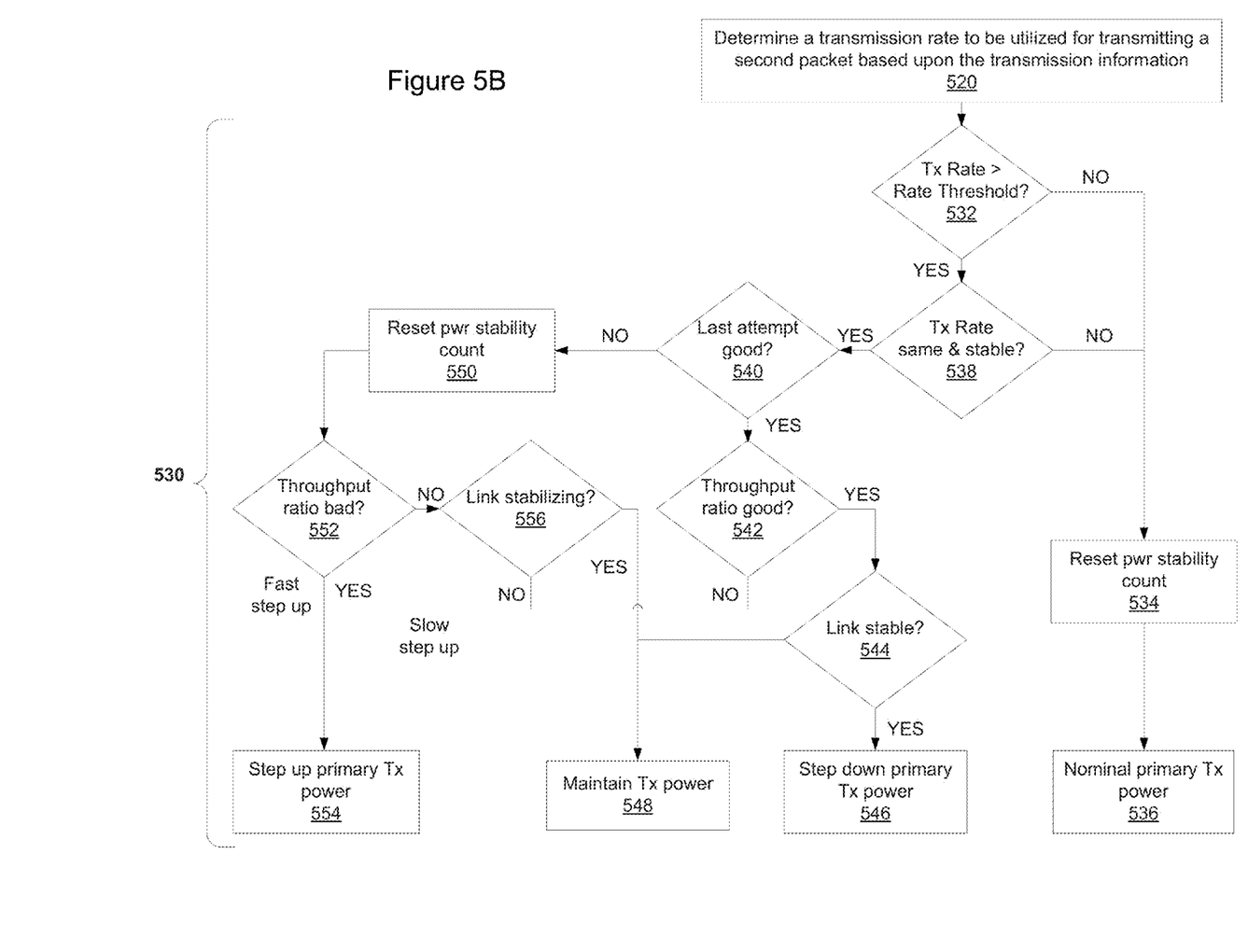

FIG. 5B illustrates example processes performed by/via the link power control algorithm in accordance with various embodiments to determine how and/or whether to regulate transmit power. At 520 (as also illustrated in FIG. 5A), a transmission rate to be utilized for transmitting a second (e.g., subsequent or next) packet can be determined based upon collected (or derived) transmission information. At 530 (as also illustrated in FIG. 5A), and in accordance with the link power control algorithm, transmit power for transmitting the second packet can be regulated based on the determined transmission rate, if a desired (e.g., current) throughput is maintainable. In particular, the link power control algorithm can operate as follows.

At 532, a current transmit rate at which a subsequent packet is to be transmitted can be compared to the Rate Threshold value set in the Rate Threshold parameter (i.e. the rate threshold for a particular link, and which can be assigned to be the highest transmit rate possible). If the current transmit rate is not greater than the specified Rate Threshold, the Power Stability Count parameter is reset at 534. At 536, the primary transmit rate can be set/maintained at nominal or maximum power.

If the current transmit rate is greater than the Rate Threshold, the link power control algorithm may then determine whether the current transmit rate is the same and stable at 538. That is, the link power control algorithm can determine whether or not the current transmit rate has, e.g., just changed, or is the same as, e.g., the previous transmit rate utilized for the link, and also, whether that current transmit rate is stable (i.e. the current transmit rate has remained the same for long enough to assume stability). In particular, the Rate Stability Measure determined and maintained in the Rate Stability Measure parameter can be compared to the Rate Stability Threshold value set in the Rate Stability Threshold parameter. If the current transmit rate is not determined to be stable, as described previously, the Power Stability Count can be reset, and the primary transmit power can be set to the nominal or maximum level.

If the current transmit rate is determined to be stable, the link power control algorithm can determine if the last transmission attempt was "good" at 540. That is, the link power control algorithm may check the status of the last transmit attempt, e.g., Short-term PSR (whether the last packet was successfully transmitted) and compare it to the Long-term PSR. For example, if the Short-term PSR is greater than the Long-term PSR, the link power control algorithm may proceed to determine whether throughput ratio is "good" at 542. That is, the link power control algorithm can compare the current Throughput Ratio (which can be represented by the following function) to the Throughput Ratio Threshold, where the $p_{rate}$ can refer to a "Primary data rate," $s_{rate}$ can refer to a "Secondary data rate," p_rate_psr can refer to the PSR associated with the Primary data rate, and s_rate_psr can refer to the PSR associated with the Secondary data rate.

$$\frac{p_{rate} * \text{p\_rate\_psr}}{s_{rate} * \text{s\_rate\_psr}} * 100$$

Again, and as alluded to previously, if the current Throughput Ratio is greater than the Throughput Ratio Threshold, it may be possible to lower transmit power. If not, transmit power can be maintained at the current transmit power. Accordingly, and if the throughput ratio is good, the link power control algorithm can determine whether the link at issue is stable at 544. That is, the Power Stability Count value maintained in the Power Stability Count parameter can be compared to the Power Stability Count Threshold maintained in the Power Stability Count Threshold parameter. Once it is determined that the link is stable, the link power control algorithm can determine to step down the primary transmit power at 546. If, however, the link is determined not to be stable, the transmit power can be maintained at its current level at 548.

Returning back to the last attempt determination at 540, if, for example, the Short-term PSR is not greater than the Long-term PSR, e.g. the last transmission attempt failed, the link power control algorithm can reset the Power Stability Count in the Power Stability Count parameter at 550. That is, the link at the current data rate and transmit power may have become unstable, thus prompting a reset. The link power control algorithm may further determine whether the throughput ratio is "bad" at 552. That is, and again, the link power control algorithm can compare Throughput Ratio to the Throughput Ratio Threshold. If the Throughput Ratio of the primary and secondary transmit rates is not greater than the Throughput Ratio Threshold, the primary transmit rate can be stepped up at 554. It should be noted that such a step up can warrant a "fast step up" utilizing the Fast Step Up Granularity step size to more quickly establish/re-establish good throughput, and ultimately, good user experience.

If the throughput ratio is not bad, and the Throughput Ratio is greater than the Throughput Ratio Threshold, it can be an indication that the link is stabilizing. Accordingly, the link power control algorithm can determine whether the link is in fact stabilizing at 556. That is, it can be determined if the Power Stability Count is greater than a value specified by the Power Stability Threshold divided by 2 (this parameter can be configurable), for example. It should be noted, that there can be other methods of determining the value in accordance with other embodiments. If it is determined that the link is not in fact stabilizing, the link power control algorithm can again step up the primary transmit power at 554 utilizing, in this instance, a Slow Step Up Granularity step size to restore/establish a desirable throughput. The step up in transmit power can be slower in this instance, as the throughput is not so bad that it requires a fast step up. If it is determined that the link is stabilizing, the link power control algorithm can determine to maintain the transmit power at 548. Also returning back to the determination as to whether throughput ratio is good at 542, if the Throughput Ratio is not greater than the Throughput Ratio Threshold, again a slow step up in primary transmit power can be determined to be an appropriate course of action at 554.

Figure 6:
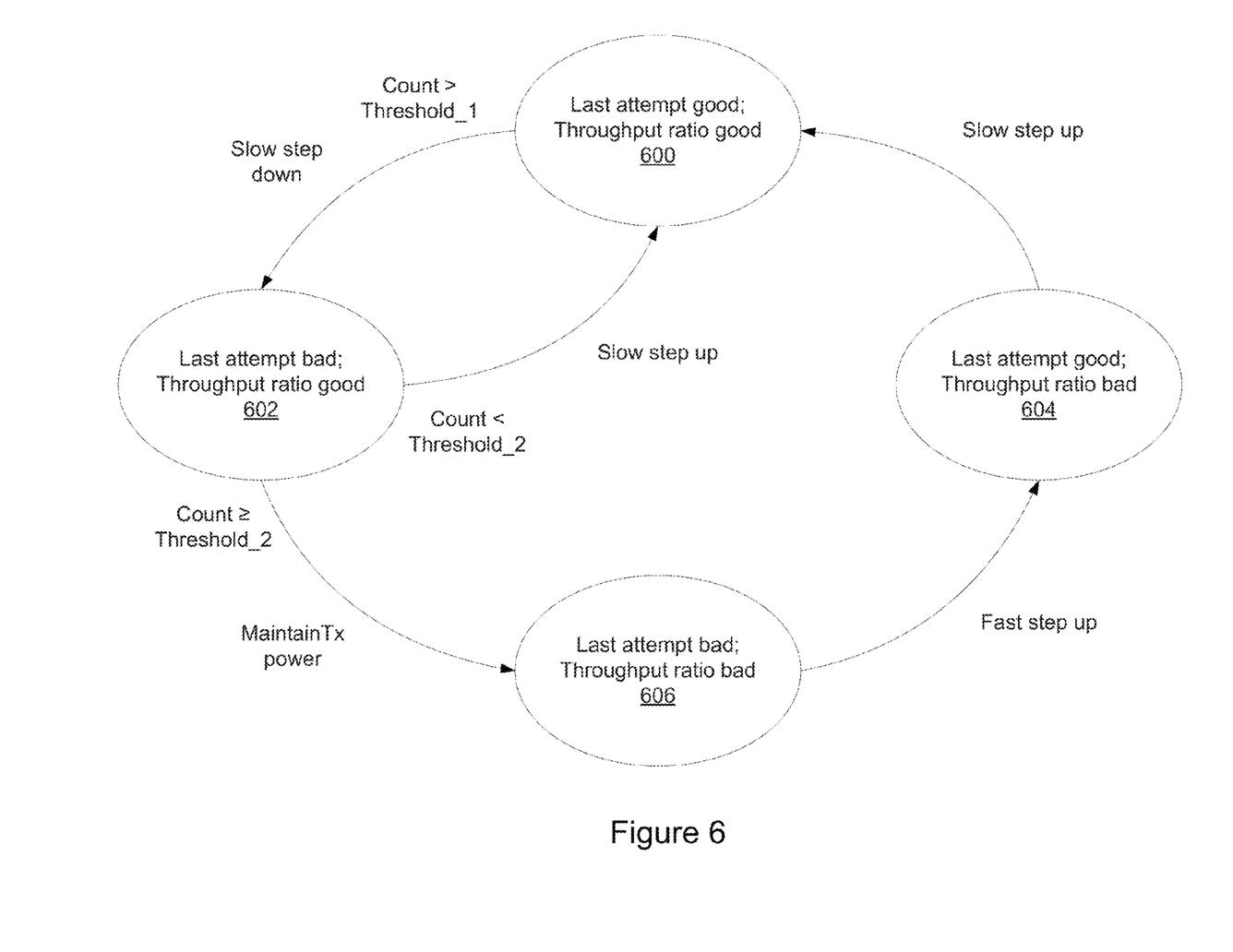
FIG. 6 illustrates an example state diagram indicative of transmission power adaptation in relation to last transmission attempt status and throughput ratio status in accordance with various embodiments of the present disclosure.

FIG. 6 illustrates an example state diagram indicative of transmission power adaptation in relation to last transmission attempt status and throughput ratio status. A first state 600 may be defined as "last attempt good; throughput ratio good." As described above and referring back to FIG. 5B (540 and 542), the link power control algorithm can determine the status of the last transmit attempt, and if the last transmit attempt has been determined as being good, it can be determined whether the throughput ratio is good or bad. If both the last attempt and throughput ratio are determined to be good, it can be determined as illustrated in FIG. 5B (544) if the link is stable, i.e. the Power Stability Count is greater than the Power Stability Threshold value (denoted in FIG. 6 as Count>Threshold_1). If the link is determined to be stable, a slow step down in transmit power can be applied. The state diagram can proceed to a second state 602.

The second state 602 may be defined as "last attempt bad; throughput ratio good," where as described above, and again referring back to FIG. 5B (540 and 552), the link power control algorithm can determine the status of the last transmit attempt, and if the last transmit attempt was bad, it can be determined whether the throughput ratio is good or bad. If the last transmit attempt was bad, but the throughput ratio is good, again link stability can be determined, i.e. if the Power Stability Count is greater than or equal to a configurable and predetermined Stabilizing Condition Assessment Threshold, e.g., the Power Stability Threshold divided by 2 (denoted in FIG. 6 as Count≥Threshold_2). If so (i.e. the link is stabilizing as illustrated in FIG. 5B (556)), transmit power can be maintained, and as illustrated, the state diagram can proceed to a fourth state 606. If however, the link is not stabilizing, i.e. the Power Stability Count is less than the configurable and predetermined Stabilizing Condition Assessment Threshold, e.g., the Power Stability Threshold divided by 2 (denoted in FIG. 6 as Count<Threshold_2), a slow step up in transmit power can be applied, and the state diagram can return to state 600.

A third state 604 may be defined as "last attempt good; throughput ratio bad." As described above and referring back to FIG. 5B (540 and 542), the link power control algorithm can determine the status of the last transmit attempt, and if the last transmit attempt was good, it can be determined whether the throughput ratio is good or bad. If the throughput ratio is bad, a slow step up in transmit power can be applied, and the state diagram can return to state 600.

The fourth state 606 may be defined as "last attempt bad; throughput ratio bad," where as described above, and again referring to FIG. 5B (540 and 552), the link power control algorithm can determine the status of the last transmit attempt, and if the last transmit attempt was bad, it can be determined whether the throughput ratio is good or bad. If both the last transmit attempt and the throughput ratio are determined as being bad, a fast step up in transmit power can be applied. The state diagram may then proceed to the aforementioned third state 604.

It should be noted that various embodiments can be implemented either in a wireless communication device such as a cellular telephone, or within an AP, or any other transmitting entity that can benefit from some level of power conservation. It should be further noted that this per-packet transmission adaptation (which can be very responsive in a volatile channel) is also applicable on a per-link, where if, for example, an AP is communicating with three wireless communication devices, if only one link to one of the wireless communications is stable, with good quality/throughput, transmit power regulation can be applied just to that one link, rather than all the links. Moreover, it should be noted that regarding the utilization of thresholds as described above, various embodiments can be configured such that meeting or exceeding a threshold can trigger some action or response, while other embodiments can be configured such that the action or response is triggered when a threshold is not met.

The use of various embodiments described herein can lead to longer battery life for wireless communication devices, and can be implemented in a variety of networks, whether BSS, IBSS, peer-to-peer, etc. Furthermore, the use of lower transmit powers can lead to denser communication networks, and higher frequency reuse. Further still, utilization of the various embodiments can be implemented on an independent basis, where a target/receiving device need not necessarily implement the same transmission power adaptation mechanism(s), and no protocol messaging overhead is required. Additionally, each wireless communication device in which various embodiments can be implemented may regulate its own respective transmit power based on feedback it is already getting through the messaging defined by the communication protocol.

The various diagrams illustrating various embodiments may depict an example architectural or other configuration for the various embodiments, which is done to aid in understanding the features and functionality that can be included in those embodiments. The present disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement various embodiments. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

It should be understood that the various features, aspects and/or functionality described in one or more of the individual embodiments are not limited in their applicability to the particular embodiment with which they are described, but instead can be applied, alone or in various combinations, to one or more of the other embodiments, whether or not such embodiments are described and whether or not such features, aspects and/or functionality is presented as being a part of a described embodiment. Thus, the breadth and scope of the present disclosure should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

Moreover, various embodiments described herein are described in the general context of method steps or processes, which may be implemented in one embodiment by a computer program product, embodied in, e.g., a non-transitory computer-readable memory, including computer-executable instructions, such as program code, executed by computers in networked environments. A computer-readable memory may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

As used herein, the term module can describe a given unit of functionality that can be performed in accordance with one or more embodiments. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality. Where components or modules of various embodiments are implemented in whole or in part using software, in one embodiment, these software elements can be implemented to operate with a computing or processing module capable of carrying out the functionality described with respect thereto. The presence of broadening words and phrases such as "one or more," "at least," "but not limited to" or other like phrases in some instances shall not be read to mean that the narrower case is intended or required in instances where such broadening phrases may be absent.

What is claimed is:

1. A method, comprising:
   collecting or deriving transmission information associated with a first packet transmitted with a first transmission rate from a wireless communication device, the collecting or deriving of the transmission information comprising determining if the first transmission rate has been maintained for at least a predetermined duration, and if a packet transmission success rate over a first duration is higher than a packet transmission success rate over a second duration that includes the first duration and extends further backwards in time;
   identifying a transmission rate to be utilized for transmitting a second packet according to the determination; and
   regulating transmit power for transmitting the second packet according to the identified transmission rate, if a desired throughput is maintainable.

2. The method of claim 1 further comprising, analyzing a medium access control (MAC) service data unit transmit status associated with the first packet prior to the collecting or deriving of the transmission information.

3. The method of claim 1 further comprising, determining the packet transmission success rate over a first duration and the packet transmission success rate over the second duration using the transmission information associated with the first packet, to determine stability of a current transmission rate.

4. The method of claim 1 further comprising, determining whether to maintain a primary transmission rate or switch to a secondary transmission rate based on respective throughputs associated with each of the primary and secondary transmission rates.

5. The method of claim 4 further comprising, determining a throughput ratio utilizing the respective throughputs associated with each of the primary and secondary transmission rates, and comparing the throughput ratio with a throughput ratio threshold based on a 100 percent packet success rate.

6. The method of claim 1 further comprising, determining stability of a link over which the first packet was transmitted and over which the second packet is to be transmitted.

7. The method of claim 1, wherein the regulating of the transmit power comprises one of maintaining the transmit power, decreasing the transmit power, and increasing the transmit power.

8. A method, comprising:
determining whether a current packet transmit rate along a link warrants adapting a current packet transmit power or maintaining the current packet transmit power at a nominal level; and
upon determining that the current packet transmit rate warrants adapting the current packet transmit power, determining throughput and stability of the link to determine how to adapt the current packet transmit power, wherein determining the stability of the link comprises determining if the first transmission rate has been maintained for at least a predetermined duration, and if a packet transmission success rate over a first duration is higher than a packet transmission success rate over a second duration that includes the first duration and extends further backwards in time,
wherein the stability of the link comprises an indication of whether a number of packets successfully transmitted at the current packet transmit rate and current packet transmit power is above a predetermined threshold number of packets.

9. The method of claim 8, wherein the determination whether the current packet transmit rate warrants adapting the current packet transmit power or maintaining the current packet transmit power is made by comparing at least one of the current throughput ratio to an ideal threshold ratio calculated by considering primary and secondary packet transmit rates, and by comparing a long-term packet success rate to a short-term packet success rate indicative of a last transmit attempt.

10. The method of claim 9 further comprising, determining whether the current packet transmit rate is stable.

11. The method of claim 10 further comprising, maintaining the current packet transmit power at the nominal level if the current packet transmit rate is not stable.

12. The method of claim 10 further comprising, determining if a previous packet transmission attempt was successful if the current packet transmit rate is stable.

13. The method of claim 12 further comprising, determining if the current packet transmit rate at the current packet transmit power is sufficient for sustaining the current throughput of the link.

14. The method of claim 13 further comprising:
determining if the stability of the link is sufficient to lower the current packet transmit power if the throughput of the link at the current packet transmit power is sufficiently high; and
maintaining the current packet transmit power if the stability of the link is not sufficient or to lower the current packet transmit power.

15. The method of claim 12 further comprising, determining if the throughput of the link at the current packet transmit power is insufficient for sustaining the current packet transmit rate if the previous packet transmission attempt was unsuccessful.

16. The method of claim 15 further comprising:
determining if the link is stabilizing upon determining that the throughput of the link at the current packet transmit power is not insufficient for sustaining the current packet transmit rate; and
increasing the current packet transmit power if the throughput of the link at the current packet transmit power is insufficient for sustaining the current packet transmit rate.

17. The method of claim 16 further comprising, maintaining the current packet transmit power if the link is determined to be stabilizing, and increasing the current packet transmit power if the link is determined not to be stabilizing.

18. An apparatus comprising:
circuitry configured to implement a packet formation module, a medium access control and physical layer management module, and a transmission power adaptation module,
the packet formation module configured to process transmission frames for transmission as packets from a transmitting wireless communication device;
the medium access control and physical layer management module configured to transmit the packets and report feedback from a receiving wireless communication device to the packet formation module; and
the transmission power adaptation module configured to determine if the first transmission rate has been maintained for at least a predetermined duration, and if a packet transmission success rate over a first duration is higher than a packet transmission success rate over a second duration that includes the first duration and extends further backwards in time, and to regulate the transmission power of the packets from the transmitting wireless communication device to the receiving wireless communication device according to the determination, wherein the regulation of the transmission power updates transmission instructions followed by the packet formation module.

19. The apparatus of claim 18, wherein the transmission power adaptation module operates in accordance with output data received from a throughput-based transmission rate selection algorithm and a link power control algorithm configured to analyze at least one of throughput, and stability conditions associated with at least one link utilized for the transmission of the packets.

20. The apparatus of claim 18, wherein the regulation of the transmission power comprises one of maintaining the transmission power, decreasing the transmission power, and increasing the transmission power.

* * * * *